US005990239A

United States Patent [19]
Chang et al.

[11] Patent Number: 5,990,239
[45] Date of Patent: *Nov. 23, 1999

[54] WEATHERABLE ASA COMPOSITION

[75] Inventors: Moh Ching Oliver Chang; Richard M. Auclair, both of Westfield, Mass.

[73] Assignee: Bayer Corporation, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/842,751

[22] Filed: Apr. 16, 1997

[51] Int. Cl.[6] ............................. C08L 51/04; C08L 25/12; C08L 33/08
[52] U.S. Cl. ................................. 525/85; 525/78; 525/80
[58] Field of Search .................................. 525/78, 80, 85

[56] References Cited

U.S. PATENT DOCUMENTS

| | | | |
|---|---|---|---|
| 3,846,510 | 11/1974 | Lanchlan et al. | 260/876 R |
| 3,944,631 | 3/1976 | Yu et al. | 260/881 |
| 4,224,419 | 9/1980 | Swoboda et al. | 525/71 |
| 4,442,263 | 4/1984 | Brandstetter et al. | 525/83 |
| 4,753,988 | 6/1988 | Henton et al. | 525/73 |
| 4,880,875 | 11/1989 | Wassmuth et al. | 525/67 |
| 5,112,910 | 5/1992 | Piejko | 525/84 |
| 5,120,788 | 6/1992 | Seitz et al. | 525/85 |
| 5,252,666 | 10/1993 | Seitz et al. | 525/80 |

FOREIGN PATENT DOCUMENTS 337187  10/1989  European Pat. Off. .

*Primary Examiner*—David Buttner
*Attorney, Agent, or Firm*—Joseph C. Gil; Aron Preis

[57] ABSTRACT

A thermoplastic composition comprising (a) a polyalkyl acrylate rubber characterized that it contains no grafted phase, and (b) a poly (vinyl aromatic-co-nitrile)-grafted polyalkyl acrylate rubber, and (c) ungrafted poly (vinyl aromatic-co-nitrile) having a number average molecular weight of about 20,000 to 100,000 g/mole is disclosed. The composition which contains about 15 to 35% by weight of polyalkyl acrylate rubber having a weight average particle size of about 0.02 to 1 microns and wherein weight ratio between (a) to the total (a)+(b) is 0.1 to 0.5, is characterized in having improved physical and mechanical properties.

21 Claims, No Drawings

WEATHERABLE ASA COMPOSITION

The present invention relates to a thermoplastic molding composition based on acrylate rubber-styrene-acrylonitrile.

A thermoplastic composition comprising (a) a polyalkyl acrylate, rubber characterized that it contains no grafted phase, and (b) a poly (vinyl aromatic-co-nitrile)-grafted polyalkyl acrylate rubber, and (c) free, that is ungrafted poly (vinyl aromatic-co-nitrile) having a number average molecular weight of about 20,000 to 100,000 g/mole is disclosed. The composition which contains about 15 to 35% by weight of polyalkyl acrylate rubber having a weight average particle size of about 0.02 to 1 microns and wherein weight ratio between (a) to the total (a)+(b) is 0.1 to 0.5, is characterized in having improved physical and mechanical properties.

The so called weatherable ASA polymers have long been known in the art—see for instance U.S. Pat. No. 3,944,631 and the documents cited therein. These polymers contain a grafted crosslinked acrylate rubber phase said to offer improved properties. Also relevant is U.S. Pat. No. 4,224,419 which disclosed a composition containing a first graft copolymer, a second graft copolymer and as a third, hard component, a copolymer of styrene and acrylonitrile. Both first and second grafts include as a substrate crosslinked acrylic ester polymers, the difference being in terms of their respective particle size: the first rubber has a mean particle diameter (weight average) 50–150 nm and the second is 200–500 nm. U.S. Pat. No. 4,753,988 disclosed a high gloss composition containing a matrix of SAN and a grafted crosslinked alkyl acrylate rubber. The elastomer phase comprise (i) rubber of particle size 0.5 to 0.8 microns and 5 to 40% grafted phase, and (ii) crosslinked rubber of 0.05 to 0.2 microns and 15 to 60 grafted phase. Inclusion of optional comonomers, such as acrylonitrile, in the acrylate rubber is disclosed.

Similarly relevant is U.S. Pat. No. 4,880,875 which disclosed optional comonomers such as acrylonitrile (AN) in a butylacrylate (BA) substrate.

Rubber grafts which contain comonomers have been disclosed in U.S. Pat. Nos. 5,120,788 and 5,252,666. The criticality of particle size in relevant compositions has been disclosed in U.S. Pat. No. 4,442,263 discloses relevant composition where the crosslinked acrylate has a particular mean particle size. In a co-pending patent application PCT/US 95 06172 there is disclosed a composition comprising a first and a second grafted acrylate rubber substrates differing one from the other in terms of their respective particle sizes, and a matrix with which each of the substrates is grafted. The compositional makeup of the rubber substrate includes acrylate and an unsaturated nitrile monomer.

The inventive thermoplastic molding composition in accordance with the present invention comprise:

(i) an ungrafted polyalkyl acrylate rubber, preferably polybutyl acrylate rubber, which may optionally be crosslinked, (ii) a grafted rubber, which may optionally be crosslinked, containing a substrate of polyalkyl acrylate, preferably polybutyl acrylate and a phase grafted thereto (herein grafted phase) where the substrate may be homopolymeric or copolymeric and where the grafted phase contains poly(vinyl aromatic-co-nitrile), preferably styrene-acrylonitrile (SAN), and (iii) an ungrafted poly(vinyl aromatic-co-nitrile), preferably styrene-acrylonitrile (SAN) having a number average molecular weight of about 20,000 to 100,000, preferably 30,000 to 70,000 g/mole.

The composition which contains about 15 to 35, preferably 20 to 30%, by weight of polyalkyl acrylate rubber having a weight average particle size of about 0.02 to 1 microns and wherein weight ratio between (a) to the total (a)+(b) is 0.1 to 0.5, preferably 0.15 to 0.45 is characterized in having improved physical and mechanical properties.

The ungrafted polyalkyl acrylate rubber, which may optionally be crosslinked, is exemplified $C_1$–$C_{18}$-alkyl acrylate and $C_1$–$C_6$-alkyl methacrylate, preferably, $C_2$–$C_8$-alkyl acrylate and $C_1$–$C_4$-alkyl methacrylate monomers. Most preferred are poly(n-butyl acrylate), poly(ethyl acrylate) and poly(2-ethyl hexylacrylate). Optionally, the rubber may contain small amounts, about 1 to 20% by weight of the amount of acrylate monomer of additional monomers such as styrene, (meth)acrylonitrile, methylmethacrylate,(meth) acrylic acid, vinylidene chloride, vinyl toluene or other ethylenically unsaturated comonomers which are copolymerizable with the acrylate monomer.

Crosslinking as an optional characteristic of the rubber useful in the present context refers to their substantial insolubility in such solvents as tetrahydrofuran, methyl ethyl ketone, cyclohexanone or acetone. The degree of crosslinking imparted to the rubber is that which results from incorporating in the substrate about 0.1 to 2.0 parts by weight (pbw) of crosslinking agent per hundred parts by weight of rubber (pphr); preferably the crosslinking agent is present in an amount of 0.4 to 1.4 pphr. Crosslinking of the copolymer substrate is attained during the polymerization of the rubber by including in the reaction, as a crosslinking agent, a di- or poly-functional ethylenically unsaturated monomer.

Among the suitable crosslinking agents mention may be made of divinyl benzene, trimethylol propane triacrylate, allyl methacrylate, diallyl fumerate, diallyl maleate, 1,3-butylene dimethacrylate, diethylene glycol dimethacrylate, ethylene glycol dimethacrylate, trimethylol propane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, octylene glycol diacrylate, trimethylolpropane triacrylate, tetraacrylate ester of pentaerythritol, ethylidene norbornene, vinyl norbornene, diallyl phosphonate, triallyl cyanurate and triallyl isocyanurate. The preferred crosslinking agent is diallyl maleate (DAM).

The ungrafted polyalkyl acrylate rubber has a weight average particle size of 0.02 to 1 microns, preferably 0.05 to 0.3 microns.

The grafted rubber, which may optionally be crosslinked, contains a substrate of polyalkyl acrylate and a phase grafted thereto (herein grafted phase). The substrate may be homopolymeric or copolymeric and the grafted phase comprise poly(vinyl aromatic-co-nitrile), preferably styrene-acrylonitrile (SAN).

The substrate is identical in all respects to (i) above and is, like (i) optionally crosslinked. The grafted phase which is optionally crosslinked, comprise poly(vinyl aromatic-co-nitrile) preferably styrene-acrylonitrile copolymer (SAN). The grafted phase contains about 20 to 40 percent of the nitrile copolymer (acrylonitrile or AN) and 80 to 60 percent of the vinyl aromatic comonomer (styrene or S). The preferred relative amounts are 25 to 35 percent of the former and 65 to 75 percent of the later, the percents being in relations to the weight of the grafted phase. Optionally, the grafted phase may include minor amounts, less than 20 percent by weight relative to the weight of this phase, of at least one member selected from the group of additional monomers such as substituted chlorobenzene, styrene (t-butyl styrene, α-methyl styrene), ethylenically unsaturated compounds (methyl methacrylate, alkyl acrylate, vinylidene chloride maleic anhydride, N-substituted maleimide) ethylene, propylene and isobutylene.

The molecular weight of the grafted phase may optionally be controlled by the use of conventional chain transfer agents. Suitable chain transfer agents include tert-dodecyl mercaptan, n-dodecyl mercaptan, terpenes, terpinolenes and chlorinated hydrocarbons.

The grafted phase may optionally be crosslinked. Crosslinking is attained by means similar to the ones discussed above in respect to the substrate. The amount of crosslinking agent incorporated in the grafted phase is about 0.05 to 0.5, preferably 0.1 to 0.3 pphr of grafted phase.

The preferred composition of the grafted phase is SAN copolymer which contains 28 percent of AN and 72 percent of styrene. Crosslinking may be attained by the introduction of DAM.

The ratio between the amounts of grafted phase to substrate in the component (ii) is in the range of about 25 to 150 pbw of grafted phase per 100 pbw of substrate.

The grafted copolymer rubber has a weight average particle size of 0.02 to 1 microns, preferably 0.05 to 0.3 microns.

The grafted copolymer rubber of the present invention is prepared by any of the methods which are well known to those skilled in the art. Preferably, these are prepared by polymerizing the styrene and acrylonitrile monomers in the presence of the rubber, by emulsion, suspension bulk or mass polymerization methods. At least a portion of the monomers are combined chemically or grafted onto the rubber substrate and a portion form ungrafted matrix.

A portion of the vinyl aromatic and unsaturated nitrile monomers polymerized in the presence of the rubber substrate used to prepare the grafted copolymer rubber of the present invention will not be grafted to the rubber substrate but will be present as ungrafted polymer, such as polystyrene-acrylonitrile (SAN). The amount of such ungrafted SAN polymer depends upon the weight ratio of monomers to rubber, the nature of the rubber and the conditions of polymerization. This ungrafted portion, preferably SAN, has a number average molecular weight of about 20,000 to 100,000, preferably 25,000 to 70,000 g/mole.

Component (iii) of the inventive composition is an ungrafted, uncrosslinked poly(vinyl aromatic-co-nitrile), preferably styrene-acrylonitrile. This component is characterized in that it contains about 20 to 40 percent of structural units derived from a nitrile comonomer, preferably acrylonitrile and 80 to 60 percent of the aromatic vinyl comonomer, preferably styrene; the preferred relative amounts are 25 to 35 percent of the nitrile comonomer and 65 to 75 percent of the aromatic vinyl comonomer, the percents being in relations to the weight of the ungrafted poly(vinyl aromatic-co-nitrile). Optionally, this phase may include minor amounts, less than 20 percent by weight relative to the weight of this phase, of additional monomers such as substituted styrene (t-butyl styrene, chlorobenzene, α-methyl styrene) or ethylenically unsaturated compounds such as methyl methacrylate, alkyl acrylate, vinylidene chloride, ethylene, propylene, isobutylene, maleic anhydride, N-substituted maleimide or mixtures of any of the above. The preferred composition of the uncrosslinked, ungrafted component (iii) contains 32 percent of AN and 68 percent of styrene. The copolymer is also characterized in that it has a number average molecular weight of about 20,000 to 100,000, preferably 30,000 to 70,000 g/mole.

The components entailed in the inventive composition are conventional and the preparation of each has been described in the art, see for instance U.S. Pat. No. 3,944,631 and the documents cited therein. Additives, such as light, including UV, and thermal stabilizers as well as antioxidants, fillers, pigments and dyes may be included in the inventive composition for their art-recognized utility.

The processing of the inventive compositions is carried out in conventional equipment and follows conventional means.

In a preferred embodiment of the invention, the acrylate copolymer rubber substrate is in the form of particles having a weight average particle size of from about 0.02 to about 1 micron, preferably from about 0.05 to 0.3 micron. The grafted phase is prepared by copolymerizing a vinyl aromatic monomer with an unsaturated nitrile in the presence of the rubber substrate to yield a graft rubber substrate with a poly (vinyl aromatic-co-nitrile) grafted phase. In the grafting procedure, the preferred vinyl aromatic monomers are styrene, α-methyl styrene, and the like. The preferred unsaturated nitrile monomers are acrylonitrile and methacrylonitrile. The relative amounts of grafting monomers used are from 5 to 40% by weight of nitrile monomer and 95 to 60% by weight of vinyl aromatic monomer based on the total weight of unsaturated nitrile and vinyl aromatic monomers used in the grafting procedure. The molecular weight of the polymer produced may be regulated through addition of commonly used chain transfer agents such as mercaptans, halo alkanes, and terpenes and terpinolenes. These may be used in an amount of 0 to 5% relative to the weight of the grafted phase. A preferred chain transfer agent for this purpose is tert-dodecyl mercaptan. The amount of total grafting monomers used is in the range of 25 to 200 pphr.

A description of the preparation of the compositions of the present invention are based on butyl acrylate-acrylonitrile copolymer rubber is set forth below. All parts and percentages are by weight unless otherwise indicated. Steps I, II, and III describe the preparation of butyl acrylate polymer, preparation of a grafted butyl acrylate copolymer, and recovery of the polymers prepared in steps I and II.

Step I. Preparation of the Rubber Substrate

To a reaction vessel equipped with an agitator and a temperature control systems is added:

| Initial Charge (parts) | Composition |
| --- | --- |
| 156.1 | water |
| 0.2 | surfactant |
| 0.1 | buffer |

These were heated with agitation to a temperature of about 65° C. under nitrogen purge. Next, a delayed charge was introduced into the reactor:

| Delayed Charge (parts) | Composition |
| --- | --- |
| (a) 0.4 | initiator |
| (b) 1.0 | surfactant |
| (c) 99.4 | butyl acrylate monomer |
| (d) 0.6 | di allyl maleate (crosslinking agent) |
| (e) 0.4 | surfactant |

Charges (c) through (e) above are metered into the reactor over a 4 hour time period. The polymerization temperature is maintained at 65° C. and upon completion, the reactor is cooled to room temperature. The resulting latex has a solid content of about 38% and a rubber particle size of 0.13 microns.

Step II Preparation of Grafted Rubber

To a reaction vessel equipped with an agitator and a temperature control system is added 277 parts of the rubber latex prepared in step I above. The latex is then heated with agitation and under nitrogen purge to a temperature of 70° C. Following the heat-up, the following is charged into the reactor:

| Charge (parts) | Composition |
| --- | --- |
| (a) 0.22 | initiator |
| (b) 0.04 | buffer solution |
| (c) 1.00 | surfactant |
| (d) 35.00 | styrene monomer |
| (e) 15.00 | acrylonitrile monomer |
| (f) 0.12 | chain transfer agent (tert-dodecyl mercaptan) |

The components are charged to the reactor over a 3 hour period while the temperature is maintained at 70° C. Reaction mixture was held at 70° C. for an additional 0.5 hour period for complete conversion. The resulting latex has a solids content of 44.5%.

Step III Recovery of Grafted Rubber and Mixtures of Same with Ungrafted Rubber

Mixtures of predetermined ratios of grafted rubber latex, ungrafted rubber latex, and an SAN copolymer latex were made such that the rubber content in the latex solids is 55%. Each of the latex mixtures was metered into an agitating 95° C., 2% coagulant solution to form a crumb particles suspended in the solution. The crumb slurry was then vacuum filtered and the resulting crumb cake washed with fresh water and again vacuum filtered. The washed and dewatered wet cake was then dried in an air circulating oven at 70° C. to attain less than 1% water.

SAMPLE PREPARATION

In the following examples the following formulation is used:

| Parts | Component |
| --- | --- |
| 45.5 | ungrafted polybutyl acrylate rubber and grafted ASA (butyl acrylate grafted SAN) |
| 54.5 | SAN |
| 0.6 | stabilizer |
| 0.5 | wax (lubricant) |

The above ingredients were melt compounded using a Leistritz twin-screw extruder (melt temperature of about 200° C.) followed by pelletizing. The total rubber content of the resulting compositions is 25% by weight based on total weight of the composition.

The pellets were dried in an air-circulating oven at a temperature of 75° C. for about 16 hours and then molded on an 80-ton Engel molding machine. The molding condition were:

stock temperature 250° C., mold temperature 66° C., injection speed =2 second screw speed 35 rpm, back pressure 8.2 Kg/cm$^2$.

An one-inch Killion single screw extruder was used to make extruded strips at various melt temperatures (360° F., 400° F., and 450° F.) and take off speeds (0.4, 2.3, 4.0, 6.5 and 8.0 cm/second). The dimension of the extruded strip is 14 cm wide and 0.3 cm thick.

All the specimens were conditioned at 23° C. and 50% relative humidity for at least 48 hours before physical testing.

Test Methods

Inverted Dart Impact—was determined in accordance with ASTM D3763. The specimen thickness was 0.26 cm, the ring diameter was 3.2 cm. and the tests were run at room temperature; the results are expressed in Joules.

Izod Impact (J/m)—was determined in accordance with ASTM D256 Tests were run at room temperature and the results are expressed in Joules/meter. The samples measured 6.35 cm×1.27 cm×indicated thickness. The test specimens were milled with a 0.25 mm radium notch at midpoint to a remaining height of 10.2 mm.

Gloss—was measured at room temperature in accordance with the procedure set forth in ASTM D523 using a Gardener Gloss meter with 60° or 20° angle on molded plaques (dimension of 10.2 cm×7.6 cm×0.32 cm) or extruded strips.

Tensile properties—Tests were run at room temperature using a Instron universal machine with cross-head speed of 5 mm/minute in accordance with ASTM D-638. Type I tensile bars were used.

Viscosity (Pascal, second)—The pellets were dried in a vacuum oven at a temperature of 70° C. for about 16 hours before the test. A capillary extrusion rheometer was used to evaluate the viscosity at 260° C. at various shear rates. The dimension of the extrusion die is 50.8 mm length (L), 1.27 mm diameter (D), L/D=40, and an entrance angle of 90°. Testing were conducted in accordance with the procedure set forth in ASTM D3835. The results are expressed in pascal second (Pa·s).

Experimental

The compositions were prepared by blending the ungrafted butyl acrylate (BA), with a mixture of SAN-grafted BA (ASA) and with free SAN. In preparing the compositions described below the following were used:

(i) the ungrafted BA was introduced in the blend as a mixture of 45 pbw free SAN and 55 pbw of a copolymer of butyl acrylate and AN (6% by weight AN). The free SAN in the mixture contained 26 pbw AN and had a molecular weight of $M_n$=48 kg/mole, $M_w$=157 kg/mole. The weight average particle size of the rubber was about 0.15 microns;

(ii) a rubber component contained 55 pbw of a copolymer of butyl acrylate rubber-AN (6% by weight AN) and free SAN, having a gel content of about 75%. The AN content of the grafted SAN phase is about 28 percent by weight; the AN content in the free SAN was 26 percent by weight. The molecular weight of the free SAN was $M_n$=48 kg/mole, $M_w$=157 kg/mole. The weight average particle size of the rubber was about 0.15 microns;

(iii) the free SAN reported in the table below is the total of the free SAN introduced in conjunction with (i) and (ii) above and SAN containing 32% AN; $M_n$=54 kg/mole, $M_w$=118 kg/mole.

All the compositions contained conventional additives used for their known utility: 0.6 parts per hundred weight of resin (pphr) of antioxidants and 0.5 pphr of a lubricant, neither having criticality to the invention. The total amount of butyl acrylate rubber in the compositions was kept at a constant 25% relative to the weight of the composition.

TABLE 1

| Example | 1 | 2 | 3 | 4 | 5 | 6 | 7 | 8 |
|---|---|---|---|---|---|---|---|---|
| ungrafted BA | 0 | 2.5 | 5.0 | 6.3 | 7.5 | 8.7 | 10.0 | 12.5 |
| SAN-grafted BA | 33.8 | 30.3 | 27.0 | 25.3 | 23.7 | 22.0 | 20.2 | 16.9 |
| Free SAN | 66.2 | 67.2 | 68.0 | 68.4 | 68.8 | 69.3 | 69.8 | 70.6 |
| rubber ratio[1] | 0 | 0.1 | 0.2 | 0.25 | 0.3 | 0.35 | 0.40 | 0.50 |
| viscosity, @ 500° F. Pa.s × $10^{-3}$ | | | | | | | | |
| @ $1s^{-1}$ | 12.9 | 11.3 | 9.6 | 8.2 | 8.8 | 7.1 | 7.5 | 6.3 |
| @ $100 s^{-1}$ | 0.96 | 0.93 | 0.92 | 0.81 | 0.81 | 0.83 | 0.81 | 0.73 |
| Gloss, injection molded parts | | | | | | | | |
| 20° | 90.5 | 90.7 | 90.0 | 89.8 | 89.5 | 88.7 | 86.9 | 72.6 |
| 600° | 96.7 | 97.0 | 97.1 | 97.3 | 97.4 | 97.5 | 97.2 | 93.1 |
| extruded parts | | | | | | | | |
| 20° | 28.3 | 21.3 | 10.0 | 6.5 | 8.3 | 7.6 | 5.6 | 5.7 |
| 60° | 87.1 | 80.2 | 53.0 | 41.6 | 51.1 | 45.0 | 36.7 | 37.2 |
| Tensile elongation | | | | | | | | |
| @ break, % | 39.6 | 31.8 | 64.6 | 70.9 | 73.1 | 65.4 | 44.0 | 67.7 |
| Impact Strength Izod, J/m | | | | | | | | |
| 1/2"[2] | 118.4 | 99.7 | 179.9 | 167.0 | 153.4 | 146.8 | 130.4 | 112.7 |
| 1/4"[2] | 46.8 | 46.2 | 153.6 | 176.0 | 176.8 | 165.4 | 160.5 | 112.8 |
| 1/8"[2] | 51.6 | 61.7 | 140.3 | 207.2 | 303.5 | 412.0 | 460.0 | 188.0 |
| Inverted Dart, Joules @ room temp. | | | | | | | | |
| $E_m$ | 22.7 | 22.7 | 21.9 | 22.0 | 21.5 | 21.3 | 21.3 | 20.8 |
| $E_f$ | 39.0 | 38.8 | 38.5 | 38.3 | 38.1 | 37.5 | 35.7 | 32.5 |

[1] refers to the ratio between the amount of ungrafted rubber to the total amount of rubber.
[2] refers to the thickness of the test specimens $E_m$ refers to energy to maximum $E_f$ refers to energy to failure The results show the criticality of the content of the ungrafted BA rubber in influencing the physical and mechanical properties of the composition. A key finding of the inventive composition is the dependence of properties on the indicated rubber ratio, at a constant rubber content.

Additionally noted are the gloss values of extruded parts which are significantly lower than the corresponding injection molding articles. Also, the gloss values of the extruded parts is greatly effected by the take-off table speed: generally, the increased take-off speed lowers the gloss. The table below summarizes the results pointing to the dependence of gloss (60°) on the take-off speed at different extrusion temperatures. The composition used in these experiments the results of which are tabulated below was the composition designated above as Example 7.

| Take-off speed | Melt Temperature (° F.) | | |
|---|---|---|---|
| cm./sec. | 360 | 400 | 450 |
| 0.4 | 18.1 | 43.3 | 66.5 |
| 2.3 | 18.9 | 23.8 | 62.9 |
| 4.0 | 20 | 19.2 | 50.7 |
| 6.5 | 20 | 17.1 | 29.8 |
| 8.0 | 20.8 | 16.1 | 28.2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (a) a polyalkyl acrylate rubber which contains no grafted phase,
   (b) a poly(vinyl aromatic-co-nitrile)-grafted polyalkyl acrylate rubber, and
   (c) ungrafted poly(vinyl aromatic-co-nitrile),
   where the weight ratio of (a) to the total (a)+(b) is 0.15 to 0.45, the total rubber content is about 15 to 35% relative to the total weight of (a), (b) and (c) and the average particle size of said polyalkyl acrylate rubber of (a) and of (b) is about 0.02 to 1 microns said polyalkyl acrylate rubber, both occurrences and independently, consisting of polymerized alkyl acrylate with or without crosslinking monomers.

2. The thermoplastic molding composition of claim 1 wherein said (a) is butyl acrylate rubber.

3. The thermoplastic molding composition of claim 1 wherein said (b) is SAN-grafted butyl acrylate rubber.

4. The thermoplastic molding composition of claim 1 wherein said (c) is SAN.

5. The thermoplastic molding composition of claim 1 wherein said average particle size of said polyalkyl acrylate rubber of (a) and of (b) is about 0.05 to 0.3 microns.

6. The thermoplastic molding composition of claim 1 wherein said total rubber content is about 20 to 30% relative to the total weight of (a), (b) and (c).

7. The thermoplastic molding composition of claim 1 wherein said (a) is a copolymer of polyalkylacrylate and about 1 to 20% of at least one copolymerized monomer selected from the group consisting of styrene, (meth)acrylonitrile, methylmethacrylate, (meth)acrylic acid, vinylidene chloride and vinyl toluene, said percent being relative to the weight of said (a).

8. The thermoplastic composition of claim 1 wherein said (a) is poly(2-ethyl hexylacrylate).

9. A thermoplastic molding composition comprising
   (a) butyl acrylate rubber which contains no grafted phase,
   (b) SAN-grafted butyl acrylate rubber, and
   (c) SAN,
   where the weight ratio of (a) to the total (a)+(b) is 0.15 to 0.45, the total rubber content is about 15 to 35% relative to the total weight of (a), (b) and (c) and the average particle size of said polybutyl acrylate rubber of (a) and of (b) is about 0.02 to 1 microns said butyl acrylate rubber, both occurrences and independently, consisting of polymerized butyl acrylate with or without crosslinking monomers.

10. The thermoplastic molding composition of claim 9 wherein said average particle size of said polybutyl acrylate rubber of (a) and of (b) is about 0.05 to 0.3 microns.

11. The thermoplastic molding composition of claim 9 wherein said total rubber content is about 20 to 30% relative to the total weight of (a), (b) and (c).

12. A thermoplastic molding composition comprising
   (a) butyl acrylate rubber which contains no grafted phase,
   (b) SAN-grafted butyl acrylate rubber, and
   (c) SAN,
   where the weight ratio of (a) to the total (a)+(b) is 0.15 to 0.45, the total rubber content is about 20 to 30% relative to the total weight of (a), (b) and (c) and the average particle size of said polybutyl acrylate rubber of (a) and of (b) is about 0.05 to 0.3 microns said butyl acrylate rubber, both occurrences and independently, consisting of polymerized butylacrylate with or without crosslinking monomers.

13. A thermoplastic molding composition comprising
   (a) a polyalkyl acrylate rubber which contains no grafted phase,
   (b) a poly(vinyl aromatic-co-nitrile)-grafted polyalkyl acrylate rubber, and
   (c) ungrafted poly(vinyl aromatic-co-nitrile),
where the weight ratio of (a) to the total (a)+(b) is 0.15 to 0.45, the total rubber content is about 15 to 35% relative to the total weight of (a), (b) and (c) and the average particle size of said polyalkyl acrylate rubber of (a) and of (b) is about 0.02 to 1 microns wherein polyalkyl acrylate rubber both occurrences, consists of polymerized alkyl acrylate and crosslinking monomers.

14. The composition of claim 13 wherein said crosslinking monomer is at least one di- or polyfunctional ethylenically unsaturated monomer.

15. A thermoplastic molding composition comprising
   (a) butyl acrylate rubber which contains no grafted phase,
   (b) SAN-grafted butyl acrylate rubber, and
   (c) SAN,
where the weight ratio of (a) to the total (a)+(b) is 0.15 to 0.45, the total rubber content is about 15 to 35% relative to the total weight of (a), (b) and (c) and the average particle size of said polybutyl acrylate rubber of (a) and of (b) is about 0.02 to 1 microns wherein polybutyl acrylate rubber both occurrences, consists of polymerized butyl acrylate and crosslinking monomers.

16. The composition of claim 15 wherein said crosslinking monomer is at least one di- or polyfunctional ethylenically unsaturated monomer.

17. A thermoplastic molding composition comprising
   (a) butyl acrylate rubber which contains no grafted phase,
   (b) SAN-grafted butylacrylate rubber, and
   (c) SAN,
where the weight ratio of (a) to the total (a)+(b) is 0.15 to 0.45, the total rubber content is about 20 to 30% relative to the total weight of (a), (b) and (c) and the average particle size of said polybutyl acrylate rubber of (a) and of (b) is about 0.05 to 0.3 microns wherein butylacrylate rubber both occurrences, consists of polymerized butyl acrylate and crosslinking monomers.

18. The composition of claim 17 wherein said crosslinking monomer is at least one di- or polyfunctional ethylenically unsaturated monomer.

19. A thermoplastic molding composition comprising
   (a) a polyalkyl acrylate rubber which contains no grafted phase,
   (b) a poly(vinyl aromatic-co-nitrile)-grafted polyalkyl acrylate rubber, and
   (c) ungrafted poly(vinyl aromatic-co-nitrile),
where the weight ratio of (a) to the total (a)+(b) is 0.15 to 0.45, the total rubber content is about 15 to 35% relative to the total weight of (a), (b) and (c) and the average particle size of said polyalkyl acrylate rubber of (a) and of (b) is about 0.02 to 1 microns said polyalkyl acrylate rubber, both occurrences, consisting of polymerized alkyl acrylate.

20. A thermoplastic molding composition comprising
   (a) butyl acrylate rubber which contains no grafted phase,
   (b) SAN-grafted butyl acrylate rubber, and
   (c) SAN,
where the weight ratio of (a) to the total (a)+(b) is 0.15 to 0.45, the total rubber content is about 15 to 35% relative to the total weight of (a), (b) and (c) and the average particle size of said polybutyl acrylate rubber of (a) and of (b) is about 0.02 to 1 microns said butyl acrylate rubber, both occurrences, consisting of polymerized butyl acrylate.

21. A thermoplastic molding composition comprising
   (a) butyl acrylate rubber which contains no grafted phase,
   (b) SAN-grafted butyl acrylate rubber, and
   (c) SAN,
where the weight ratio of (a) to the total (a)+(b) is 0.15 to 0.45, the total rubber content is about 20 to 30% relative to the total weight of (a), (b) and (c) and the average particle size of said polybutyl acrylate rubber of (a) and of (b) is about 0.05 to 0.3 microns said butyl acrylate rubber, both occurrences, consisting of polymerized butylacrylate.

* * * * *